United States Patent Office 3,338,353
Patented Aug. 29, 1967

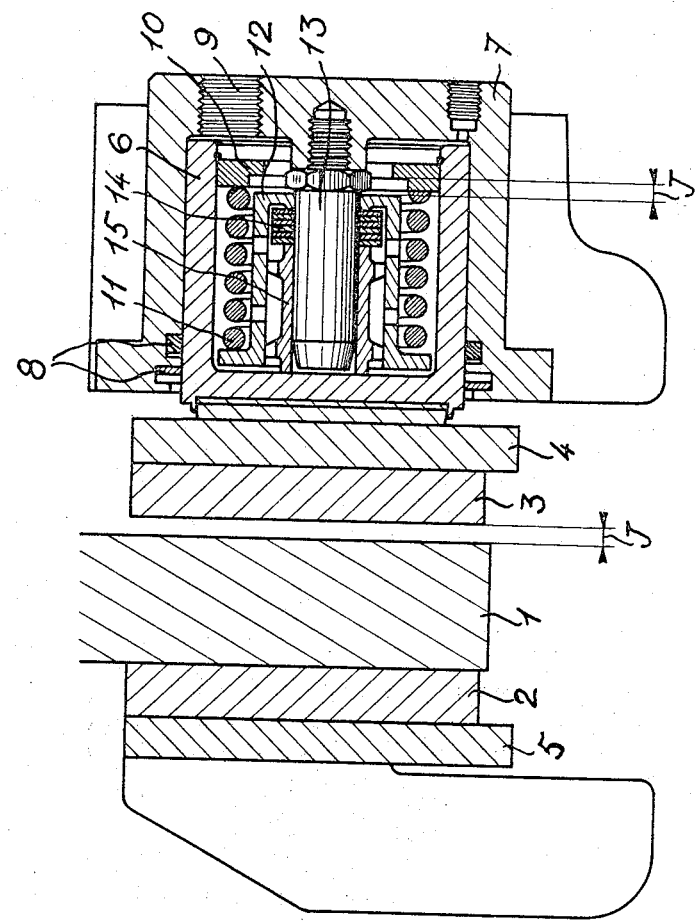

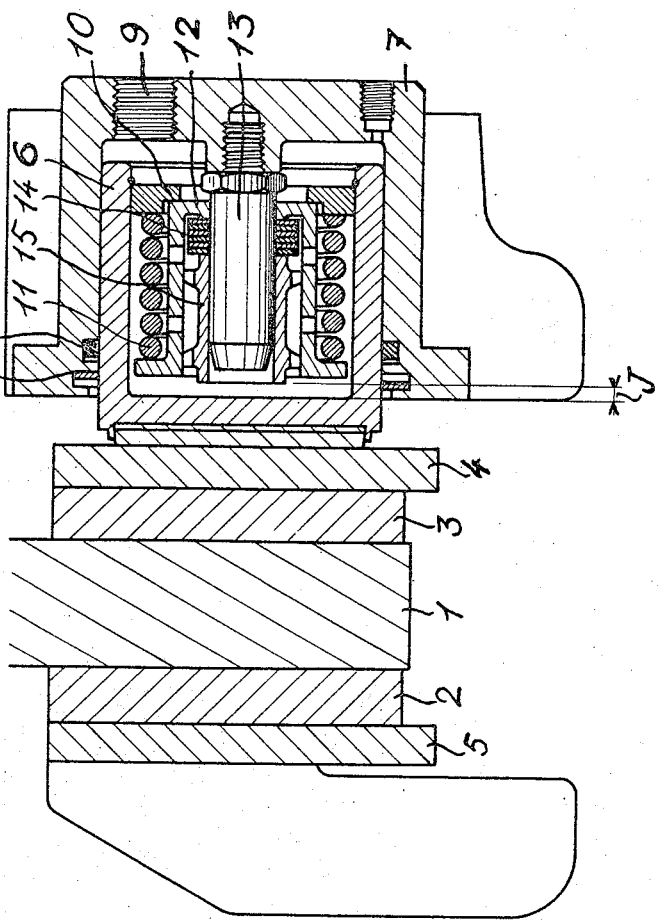
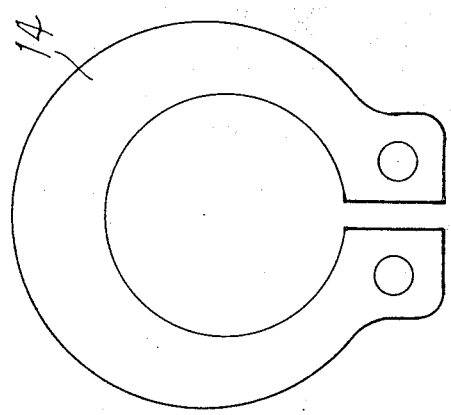

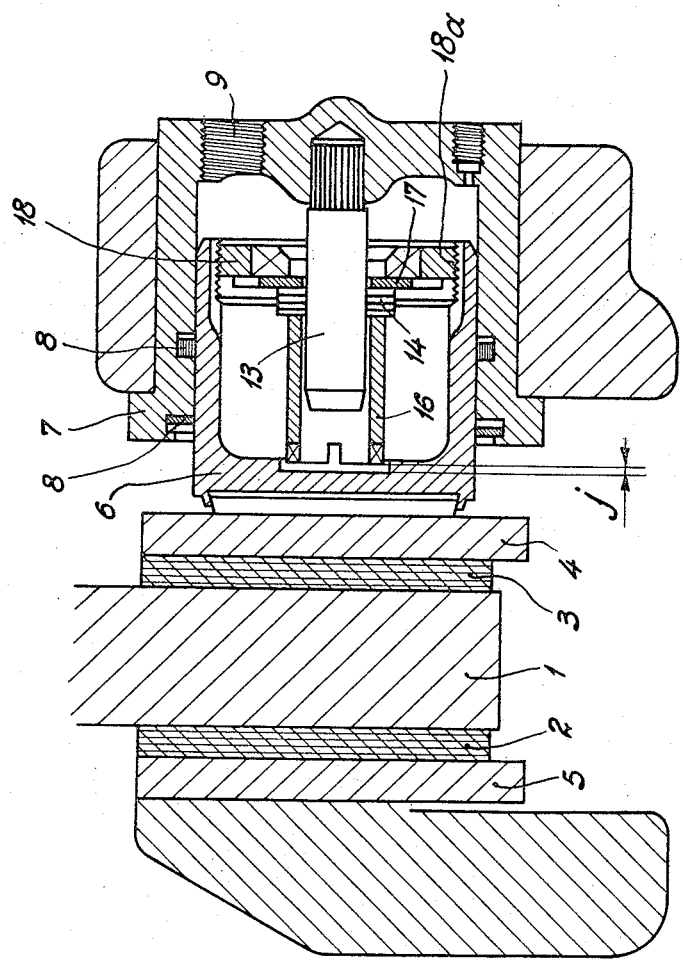

3,338,353
AUTOMATIC ADJUSTING DEVICE FOR
DISC BRAKE
René Lucien, 56 Blvd. Maillot, Neuilly-sur-Seine, France
Filed June 10, 1965, Ser. No. 463,056
Claims priority, application France, June 10, 1964,
977,805, Patent 85,921; July 9, 1964, 981,332,
Patent 86,134
6 Claims. (Cl. 188—196)

Automatic devices for taking-up wear, in particular of brake linings, are already known which utilize the friction of elastic rings on the internal or external lateral surface of a cylindrical member. By way of example, devices of this kind are described in French Patent No. 1,146,681 filed on Jan. 19, 1956 by the same applicants, in which the elastic rings are of rubber, and in French Patent No. 1,151,131 filed on June 1, 1956 and its addition No. 75,495 filed on Mar. 17, 1959 by the same applicants, in which the elastic rings are of metal.

The device according to the invention preferably utilizes a plurality of elastic metal rings of small thickness coupled to each other, acting by pressing on or inside a cylindrical surface, this plurality of rings having the following advantages:

By varying the number of rings according to the application considered, it is possible to regulate with great accuracy the value of the friction force obtained, thus taking account of the particular conditions of operation to be observed for each application.

The use of a number of rings makes it possible to compensate automatically for a possible failure of one of them.

The fact of employing thin rings coupled to each other enables an intimate clamping effect to be obtained on the cylindrical contact surface and over the whole length of the stack of rings; for this reason, the value of friction obtained is defined with great precision, irrespective of the position of the rings during the course of wear. This arrangement is also favourable to operation at high temperature.

The rings employed may be standard parts manufactured in mass production, which are found in commerce at very low prices.

In the device according to the invention, the friction means, for example the thin elastic rings acting by clamping on or inside a cylindrical surface, are placed between a spacing member, sliding with friction on or inside the same surface and serving as an abutment for the operating member at the end of its return travel, and a sleeve sliding on or inside the same surface, the said sleeve being on the one hand pushed by the operating member in its outward travel, after this member has travelled over the distance intended to constitute the return travel of the said member, and on the other hand subjected to the action of a compression spring placed between itself and the said member.

It will be observed that this spring, which effects the return of the operating device, applies according to the invention, a continuous force of the elastic rings pressing against the spacer.

Various forms of construction of the invention will be described below in detail, by way of example and not in any limitative sense, in their application to the jacks of disc brakes, reference being made to the accompanying drawings, in which:

FIGS. 1 and 2 are axial sections of the disc brake provided with a first form of construction of the device for taking-up wear, respectively in the released position and in the gripping position.

FIGS. 3 and 4 show a thin elastic ring uitlized in the device according to the invention.

FIGS. 5 and 6 are figures similar to FIGS. 1 and 2 and illustrate an alternative form of the invention.

In the various figures, the same parts of the brake or of the device for taking-up wear have been given the same reference numbers.

Figure 5:
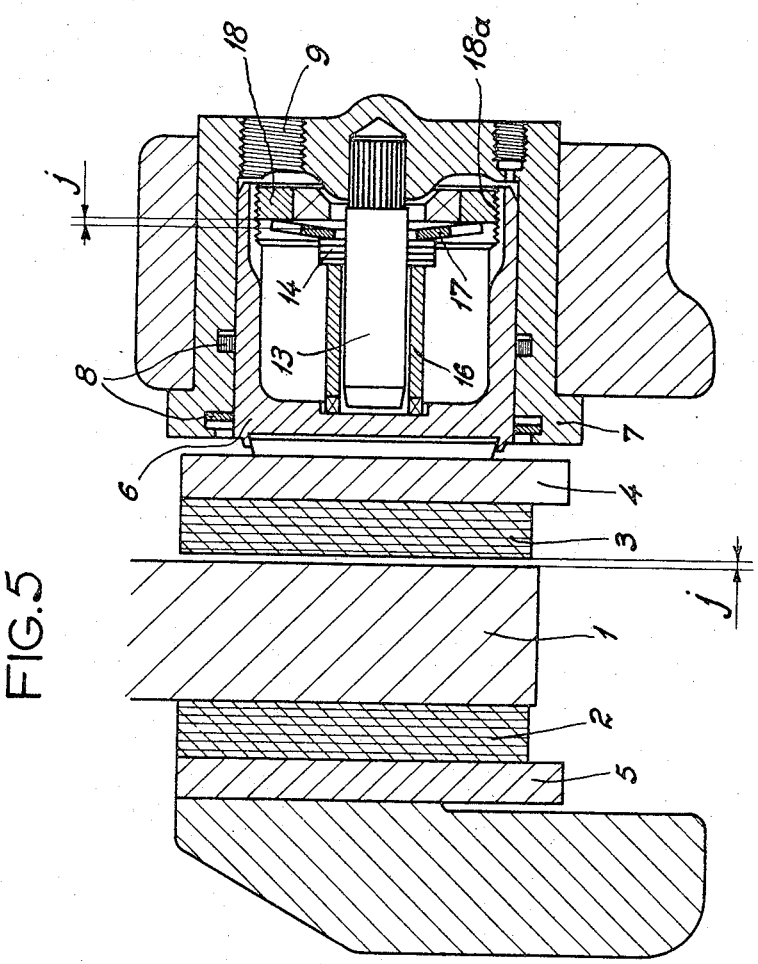

In FIG. 1 the brake disc 1 is located between the friction linings 2 and 3 with their lining carriers 4 and 5. The assembly 2–5 is stationary while the unit 3–4 is fixed to a piston 6 sliding in the cylinder 7 of the jack, fluid-tightness being ensured by joints 8 and the supply being led-in through the intake 9. The piston 6 is hollow, in the shape of a U on its side, with the base of the U against the lining-carrier 4 and, on the opposite side, the opening of the U is provided internally with an inserted washer 10; a release spring 11 is housed inside the piston 6 and is supported on one side against the washer 10; a sleeve or casing 12, also in the shape of a U on its side, is housed inside the piston 6, the arms of the U turned towards the disc and serving to support the spring 11, the base of the U being pierced and sliding on a cylindrical rod 13, screwed axially into the cylinder 7; thin elastic rings 14 are placed around the rod 13 between the base of the sleeve 12 and a spacing member 15, housed inside the sleeve 12 and sliding on the rod 13 with friction.

In the released position of the brake shown in FIG. 1, the spring 11 supported against the rings 14 through the intermediary of the sleeve 12 has returned the piston 6 to its released position until it abuts against the spacing member 15 which abuts in turn against the rings 14. It will be observed that the position of the members of the released brake is fixed solely by the position of the rings 14 on the rod 13. It will also be observed that the elastic rings 14 are gripped by the release spring 11 in the released position of the brake. In this released position, the dimensions adopted for the device according to the invention are such that there is formed, between the washer 10 and the base of the sleeve 12 a clearance J equal to the release clearance which it is intended to give to the brake.

When the pressure is applied to the intake 9, it causes the piston to move forward and cause approach of the disc 1 towards the lining 3 by compressing the spring 11. In this movement, the clearance J between the washer 10 and the sleeve 12 is first of all absorbed without the sleeve 12, the rings 14 and the spacing member 15 changing position; the play J then appears between the piston 6 and the spacer 15. It will be observed that the elastic rings 14 are always gripped by the released spring 11 (through the intermediary of the sleeve 12) against the spacer 15 (mounted with friction on the rod 13 as already stated). Then, if during the operation of the brake the linings become worn to a certain thickness, the piston 6 projects further, moving forward as a unit with the washer 10, the sleeves 12, the elastic rings 14 and the spacer 15. The play J remains formed between the piston 6 and the spacer 15. It will also be observed that in this displacement as a whole, the piston 6 has kept the elastic rings 14 gripped against the spacer 15 by means of its washer 10 and the sleeve 12.

When the pressure is no longer applied at the intake 9, the spring 11 returns the piston 6 until it abuts against the spacer 15, and therefore over a length equal to the play J existing between these parts at the end of the braking action. It will be observed that the release of the brake always remains equal to the play J, whatever the wear of the lining has been during the braking action. This play J thus appears, not only between the sleeve 12 and the washer 10 of the piston 6, but also between the disc 1 and the lining 3 (FIG. 1).

The continuous gripping of the elastic rings 14 is obtained very simply by the releasing spring 11 of the brake, the sole condition being that the spacer 15 is mounted on the cylindrical rod 13 with friction, as already stated.

One type of thin elastic ring which can be used in the device according to the invention is illustrated by way of non-limitative example in FIGS. 3 and 4.

In the form of construction of the device which has just been described, the helicoidal restoring spring is only supported against the stack of elastic metal rings through the intermediary of the sleeve and does not therefore act directly. In addition, the washer against which this spring is supported is fixed in position once and for all with respect to the piston, by means of a keeper-ring, a circlip or other similar device, and it is thus not possible to adjust the value of the working clearance or play.

In the alternative form shown in FIGS. 5 and 6 on the contrary, the restoring spring of the piston is directly supported against the elastic metal rings, without the interposition of any other member. This result is obtained for example by replacing the helicoidal spring previously employed by a spring with blades of frusto-conical shape, the large base of which is supported against the washer fixed to the piston while the small base is supported against the rings, the latter being held, at the other extremity of the stack, by a simple spacer, without the use of a sleeve being necessary.

In addition, the washer fixed to the piston is no longer fixed in position with respect to the piston, but can be moved, for example by means of a thread cooperating with a corresponding threaded portion of the piston, so as to be able to adjust the working play.

Figure 7:
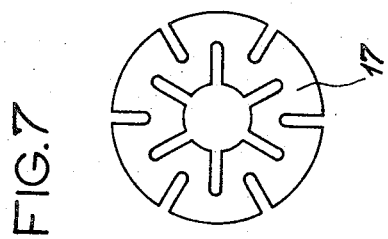
FIG. 7 is a plan view of an elastic spring utilized in this alternative form.

In this form of construction, the elastic metal rings 14 can slide axially on the rod 13 fixed to the cylinder 7, supported on the one hand against a spacer 16, coaxial with the rod 7 on which it can slide, and on the other hand, without the interposition of any other member, against the small base of a blade spring 17 of frusto-conical shape, shown in detail in FIG. 7. This spring 17 is itself supported by its large base against a washer 18, an external threaded portion 18a of which co-operates with an internal thread of the piston 7, in which it is thus possible to regulate its position at will.

The operation of the device for taking-up wear is similar to that of the device previously described. As indicated above, the working clearance J can be readily adjusted by movement of the washer 18 with respect to the piston 7.

Figure 8:
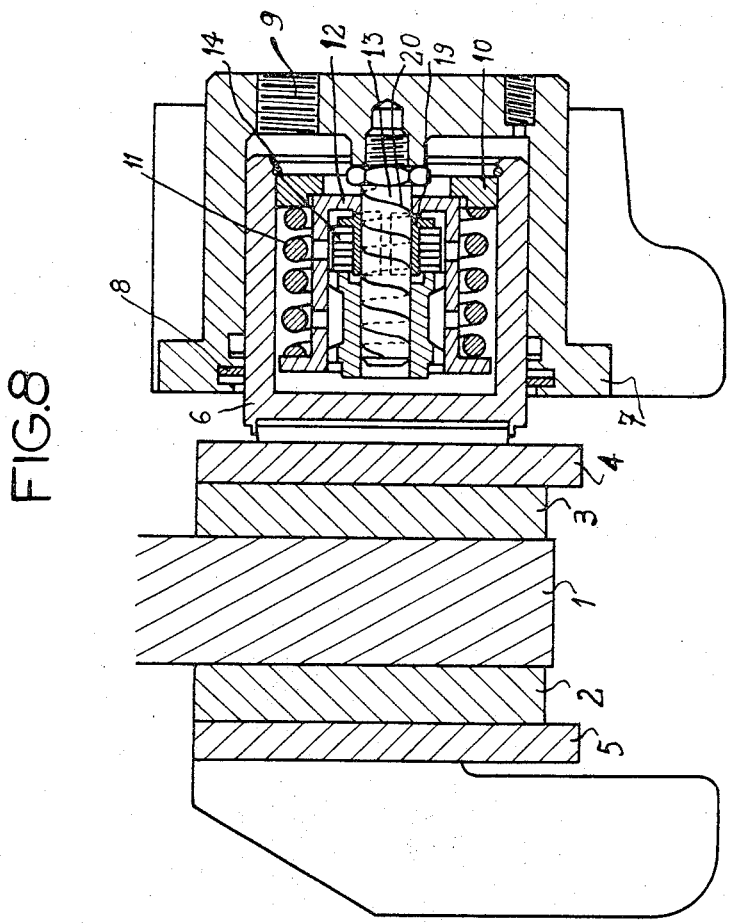
FIG. 8 is an axial section of a brake provided with a further alternative form of the device in accordance with the invention.
Figure 9:
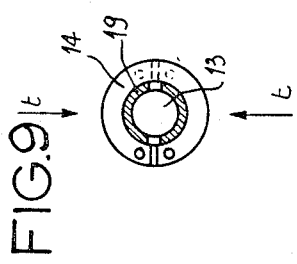
FIG. 9 illustrates the respective positions of the parts employed in this alternative form.

In the alternative form of the invention illustrated in FIGS. 8 and 9, the object is to render uniform the longitudinal friction force which is produced between the fixed cylindrical rod and the elastic rings.

In this alternative, the elastic rings no longer act directly on the fixed rod but on a split ring interposed between the said rings and the said rod and sliding with friction on this latter.

This arrangement has the advantage of substantially improving the constancy of the frictional force, since this force does not result from the individual friction of each of the rings but from that of the split ring which is subjected to the sum of the radial tensions of the various rings.

In addition, it is thus possible to vary the friction force for the same radial tension of the elastic rings, by modifying simply the nature of the materials of the friction elements.

According to a further characteristic feature of this alternative construction, a groove is formed at the periphery of the rod, over the whole length of this latter.

The lubrication of the contact zones is thus effected easily and uniformly during the course of the movement of the various members, which makes the friction uniform.

In this alternative form of the device for taking-up wear, a split ring 19, shown in detail in FIG. 9, is interposed between the rod 13 and the rings 14 which come into abutment against it at their extremity opposite to the spacer 15. The radial tension t of the elastic rings 14, illustrated by arrows in FIG. 1, is thus not applied directly on the rod 13 but on the split ring 19 which thus transmits to the rod the sum of the tensions which are applied to it. It is clear that, without changing the rings, and for the same radial tension of the rings, it is possible to vary the magnitude of the friction force by simply changing the nature of the material of the ring 19.

In order to facilitate the lubrication of the parts of moving members which are in contact with each other, a groove 20 with a helicoidal profile is formed at the periphery of the rod 13 and over the whole length of this latter.

It will be understood that the applications described above can be changed to any other case of application in which the wear of a part must be taken-up in order to keep a constant operating travel, as well as to the applications in which the elastic rings act on the internal lateral surface of a cylindrical member.

What I claim is:

1. An automatic device for taking-up wear in the linings of a disc brake, said device comprising: a cylinder, a piston slidably mounted in said cylinder for movement between an extended position in which the disc brakes are activated and a retracted position in which the disc brakes are inactive, said piston having an internal cavity, a washer in said cavity secured to said piston and movable therewith, a rod fixed in said cylinder and extending into said piston through said washer, a spacer encircling said rod, a plurality of elastic metal rings frictionally mounted on said rod, an elastic blade spring of frusto conical shape acting directly against said rings and said washer and urging the spacer into contact with the piston, said blade spring being deformable into flat shape when the brakes are activated whereby the piston and washer can travel in the cylinder a predetermined distance relative to the rings, said spring upon deactivation urging the washer and piston to travel by said predetermined distance in opposite direction.

2. A device as claimed in claim 1 wherein said washer is secured to said piston for axial adjustment therein to thereby control the initial degree of conicity on the blade spring and consequently enable adjustment of the magnitude of relative travel of the piston and the rings.

3. A device as claimed in claim 1 wherein said piston, spacer, rings and washer constitute an assembled self-contained unit.

4. A device as claimed in claim 1 wherein said spring has a larger base which contacts the washer.

5. A device as claimed in claim 1 wherein said spring has an outer circumference and a central opening and is provided with radial notches extending outwardly from said opening and inwardly from said outer circumference in regularly offset relation.

6. A device as claimed in claim 1 wherein said rod is provided with a spiral shape groove.

References Cited

UNITED STATES PATENTS

| 2,844,223 | 7/1958 | Runner | 188—72 X |
| 2,866,526 | 12/1958 | Wiseman | 188—196 X |
| 3,085,663 | 4/1963 | Jakeways | 188—196 |
| 3,122,222 | 2/1964 | Burnett et al. | 188—196 |

FOREIGN PATENTS 74,959   1/1961   France.
(1st addition to 1,160,808)

DUANE A. REGER, *Primary Examiner.*